Sept. 22, 1964 LE ROY GILBERT 3,149,858
STEERABLE TRAILER VEHICLE
Filed Dec. 29, 1960 4 Sheets-Sheet 1
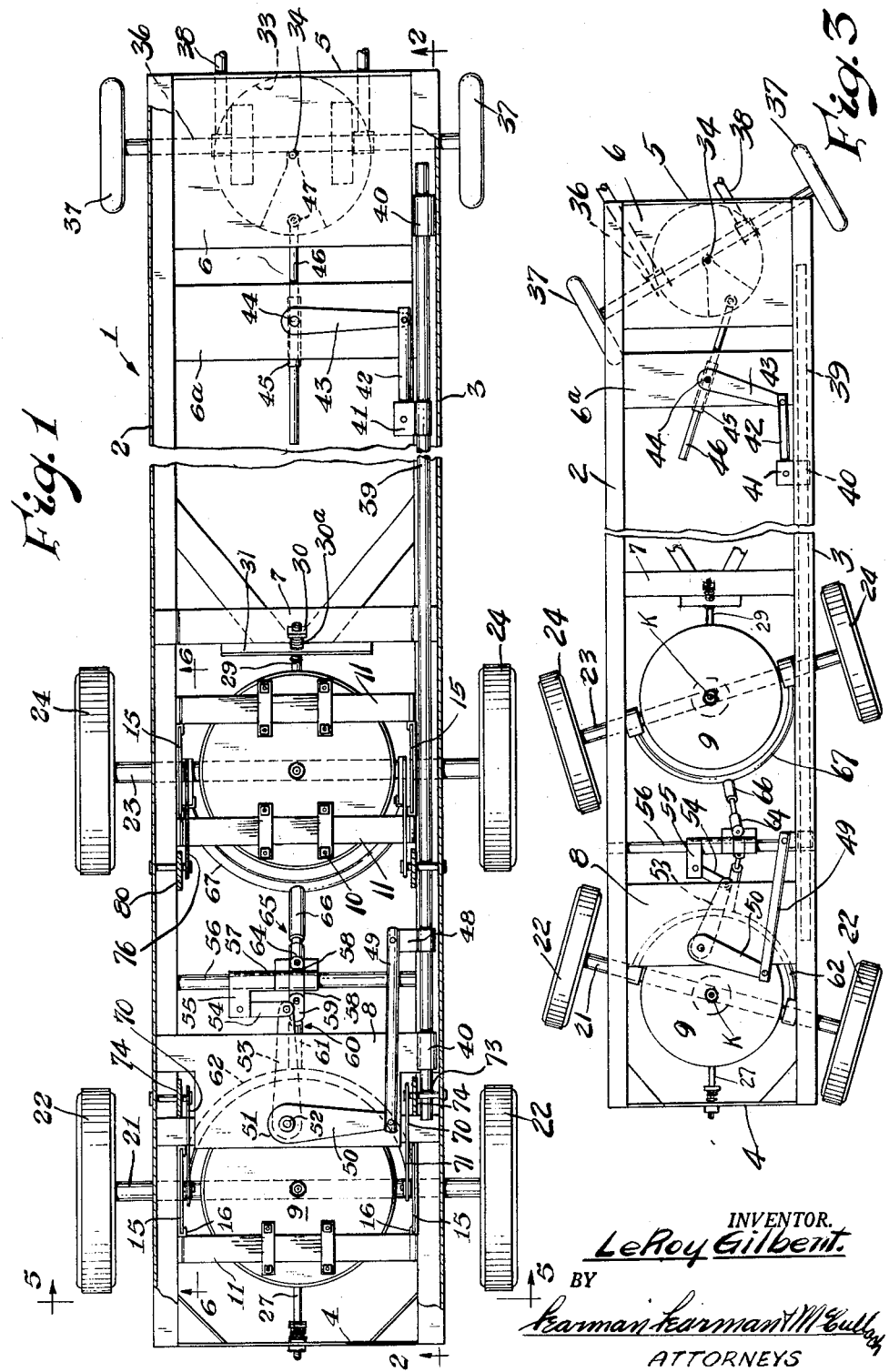
INVENTOR.
LeRoy Gilbert.
BY
Searman Searman & McCull
ATTORNEYS Sept. 22, 1964　　　　LE ROY GILBERT　　　　3,149,858
STEERABLE TRAILER VEHICLE
Filed Dec. 29, 1960　　　　　　　　　　　　　　　4 Sheets-Sheet 2
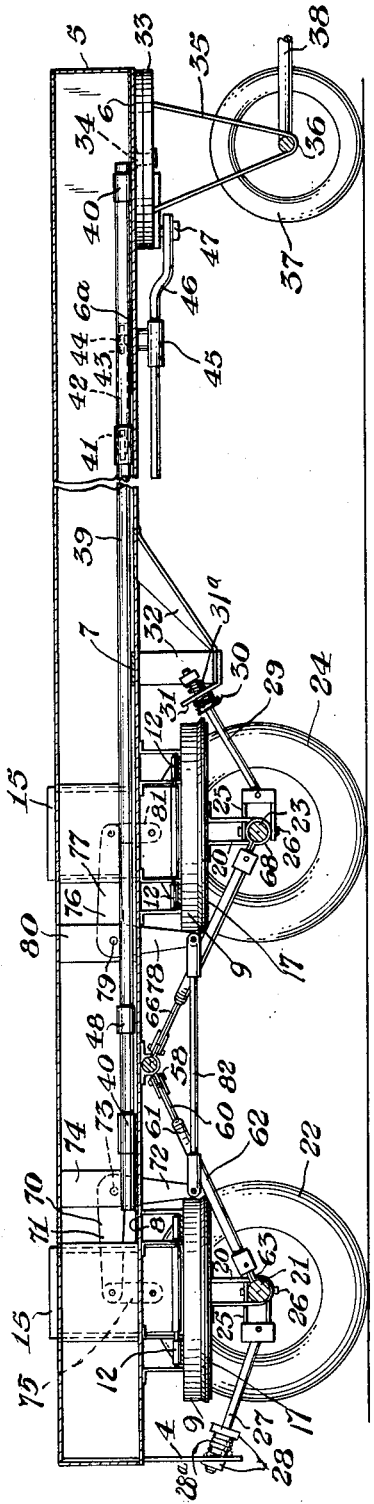
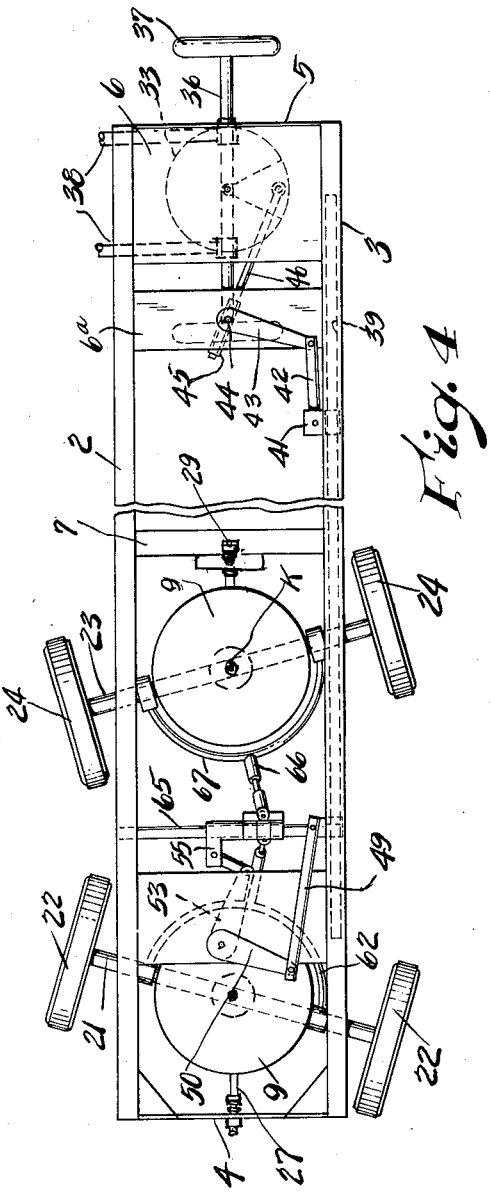
INVENTOR.
Le Roy Gilbert.
BY
Searman Searman & McCulloch
ATTORNEYS Sept. 22, 1964   LE ROY GILBERT   3,149,858
STEERABLE TRAILER VEHICLE Filed Dec. 29, 1960   4 Sheets-Sheet 3

INVENTOR.
LeRoy Gilbert
BY
Fearman Fearman & McCulloch
ATTORNEYS

Sept. 22, 1964  LE ROY GILBERT  3,149,858
STEERABLE TRAILER VEHICLE
Filed Dec. 29, 1960  4 Sheets—Sheet 4
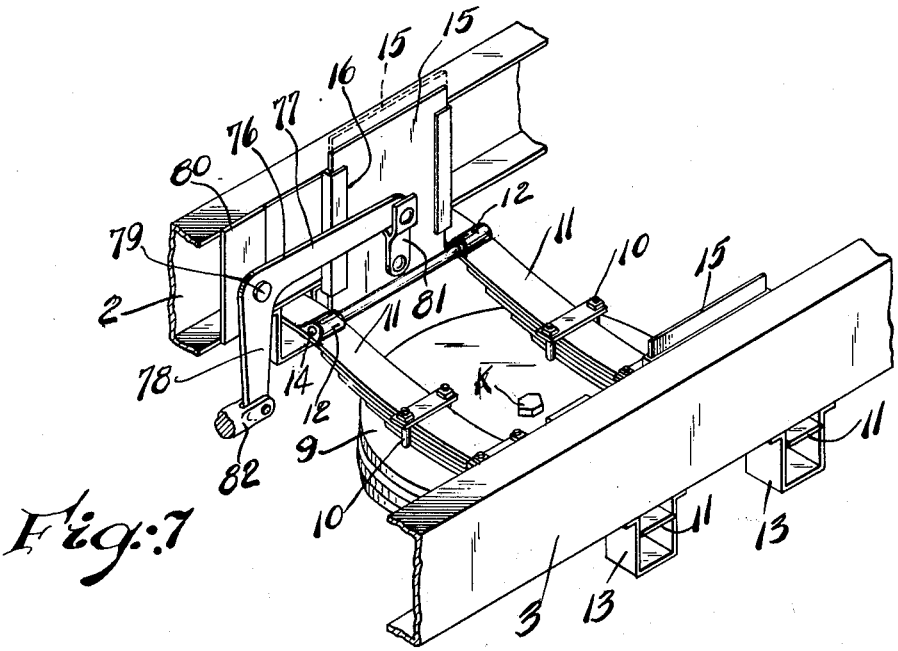
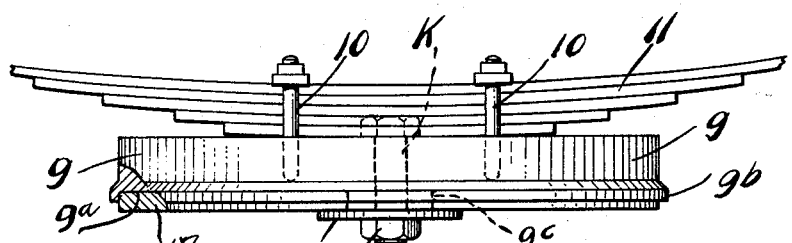
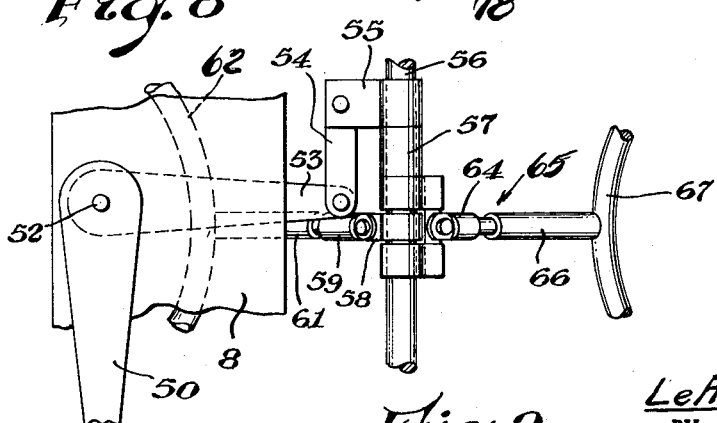
INVENTOR.
LeRoy Gilbert
BY
Fearman Fearman McCulloch
ATTORNEYS United States Patent Office 3,149,858
Patented Sept. 22, 1964

1

3,149,858
STEERABLE TRAILER VEHICLE
Le Roy Gilbert, 366 N. Gratiot Ave.,
Mount Clemens, Mich.
Filed Dec. 29, 1960, Ser. No. 79,275
4 Claims. (Cl. 280—442)

This invention relates to trailer vehicles and more particularly to trailers having steerable wheels and wherein the steering mechanism automatically is actuated by turning movements of a towing vehicle to which the trailer is coupled.

Trailer vehicles currently in use are provided with one or more axles adjacent the rear end of the trailer and on which the majority of the load carried by the trailer is supported. Most states regulate the load which can be carried in a trailer by the weight supported by each axle, so it is not uncommon for heavy duty trailer vehicles to have axles arranged in tandem. In order to provide for as even a distribution of the weight as is possible, the axles of a trailer should be spaced a substantial distance apart. Where the axles of a trailer are spaced apart a substantial distance, however, turning of the trailer causes the trailer wheels to be dragged or skidded across the pavement, thereby subjecting the tires to excessive wear and the suspension apparatus to considerable stress and strain.

Trailer bodies usually are provided with doors or gates at their rear ends through which the trailer body may be loaded or unloaded and more often than not the trailers are required to be backed into position at a dock, loading area, or relatively narrow passageway. Proper alignment of a trailer with the dock usually requires considerable turning movement of the trailer, and in those instances where the trailer is provided with axles arranged in tandem, the tendency of the wheels to skid or drag across the pavement causes considerable difficulty in properly aligning the trailer with the dock.

It has been proposed heretofore to provide steerable wheels for trailers, but such proposals have not been altogether successful for a number of reasons such as unduly complicated mechanisms which are expensive not only in their manufacture but also in their maintenance, and the fact that the steering cannot be accurately controlled. In addition, the known prior art proposals have not provided for the protection of the steering mechanism against damage by extremely sharp turns of the towing vehicle, such as frequently occur when a trailer is being backed into position against a dock. Further, the steerable trailer vehicles known heretofore have not provided for the stabilization of the trailers' load during steering movements of the trailers' wheels, with the result that the prior art trailers of the general class under consideration are subject to the danger of tipping, which danger is magnified by the tendency of the trailer wheels to be dragged or skidded across the pavement or roadway.

An object of this invention is to provide a trailer vehicle having a number of load supporting axles spaced longitudinally of the vehicle so as to distribute the load to be carried thereby over a substantial length of the vehicle, and in which the load supporting axles are steerable so as to minimize skidding or dragging of the wheels across the pavement during sharp turns and to facilitate accurately backing a trailer in a position to be loaded or unloaded at a dock.

Another object of the invention is to provide a trailer vehicle having steerable axles and in which the steerable mechanism is operable automatically upon turning of the towing vehicle.

A further object of the invention is to provide a trailer

2 vehicle having steering mechanism of the kind referred to and wherein the steering mechanism includes lost motion apparatus effective upon predetermined turning movement of the towing vehicle to disable further turning of the trailer wheels so as to prevent excessive and unsafe turning of the trailer wheels.

Another object of the invention is to provide a trailer vehicle having steerable wheel assemblies and including means reacting between the wheel assemblies for stabilizing the vehicle load.

Other objects and advantages of the invention will be pointed out specifically or will become apparent from the following description when it is considered in conjunction with the appended claims and the accompanying drawings, in which:

FIGURE 1 is a view partly in top plan and partly in section of a trailer frame equipped with apparatus constructed in accordance with the invention;

FIGURE 2 is a section view taken on the line 2—2 of FIGURE 1;

FIGURE 3 is a diagrammatic view on a reduced scale illustrating the steerable wheels turned as when backing;

FIGURE 4 is also a diagrammatic view on a reduced scale illustrating the steerable wheels turned to their maximum positions and the trailer coupling mechanism turned to a position sufficient to cause the turning of the trailer steerable wheels to their positions of maximum turn;

FIGURE 7 is an enlarged, fragmentary, perspective view of one of the mounting disks, springs, and associated parts, the broken lines illustrating the movement of the suspension members;

FIGURE 8 is an enlarged, edge elevational view of one of the mounting disks, part being broken away to show the construction;

FIGURE 9 is an enlarged, fragmentary plan of the slide mechanism.

Figure 5:
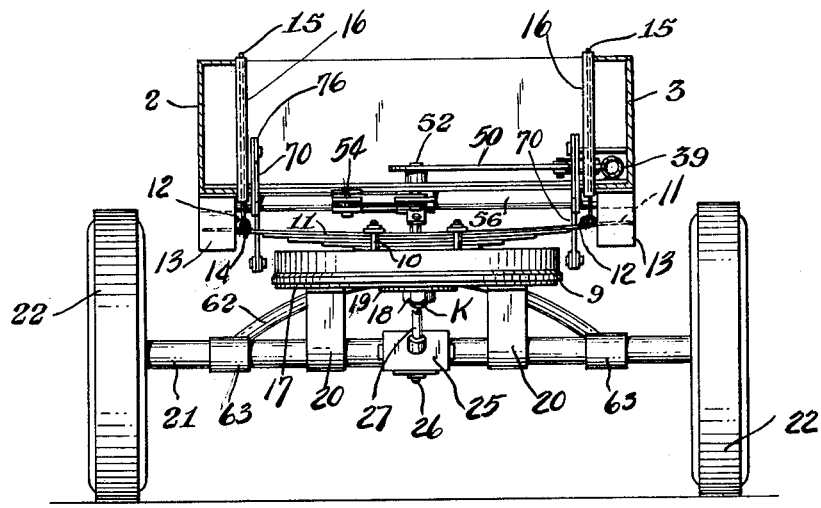
FIGURE 5 is a transverse, sectional view taken on line 5—5 of FIGURE 1.
Figure 6:
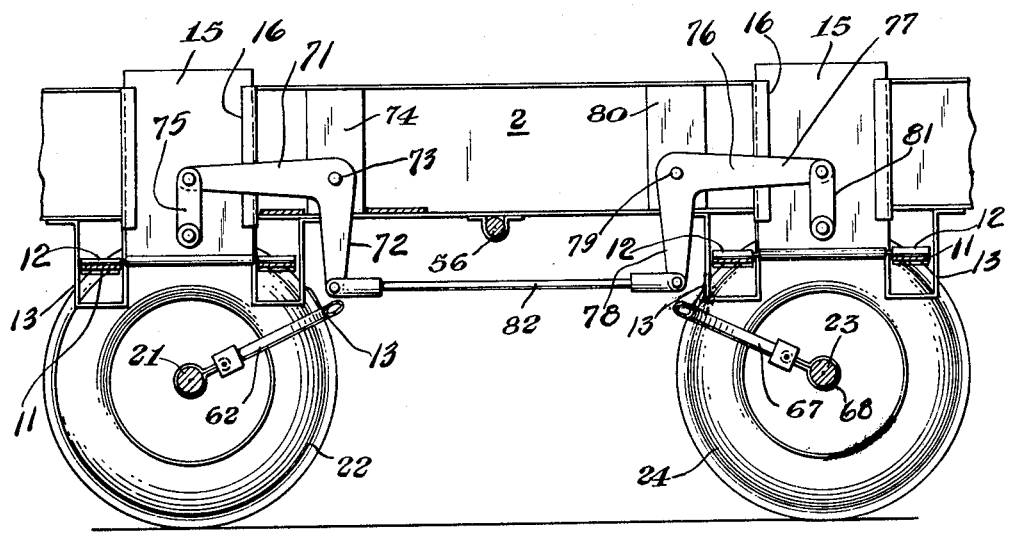
FIGURE 6 is a fragmentary, part sectional, side elevational view taken on the line 6—6 of FIGURE 1.

Apparatus constructed in accordance with the invention comprises a trailer frame 1 composed of spaced apart, substantially parallel channel frame members 2 and 3 interconnected at opposite ends by frame members 4 and 5 and having a number of cross braces 6, 6a, 7 and 8 welded or otherwise suitably fixed thereto.

Adjacent the rear end of the trailer frame is a mounting disk or plate 9 on which is mounted, by means of U bolts or the like 10, a pair of transversely disposed leaf springs 11 having bushings 12 provided adjacent their opposite ends. The plate 9 may be a conventional member known as a fifth wheel, and preferably it is recessed on its lower face as at 9a and is flared as at 9b to accommodate a turn table plate 17. A reduced tubular extension 9c is formed integral with the plate 9 and extends through a suitable opening in the plate 17, the plates 9 and 17 being connected by means of a king bolt K with washers 19 thereon as usual. The ends of the springs 11 may be loosely received in guide members 13 that are fixed to the lower surface of the frame members 2 and 3, said springs being vertically movable in said guides 13. Vertically movable suspension members 15 are mounted in guides 16 provided at opposite sides of the frame members 2 and 3, the lower ends of the guides being turned to accommodate projecting pins 14 which are journaled in the bushings 12.

The king bolt K serves to hold the members 9 and 17 in assembled, relatively rotatable relation by means of a nut and washer 18 and 19 or by any other suitable means.

Fixed to the plate 17 is a pair of downwardly extending support members 20 and in which is mounted an axle 21 having ground engaging wheels 22 journaled at opposite ends thereof. The arrangement is such that the axle 21 is rotatable about the substantially vertical axis of the king bolt K and is yieldably suspended from the trailer frame by the springs 11, the suspension members 15 and their associated parts.

Mounted forwardly of the axle 21 is another axle 23 having ground engaging wheels 24 journaled thereon, the mounting means for the axle 23 being the same as the mounting means for the axle 21 and similar parts being identified by similar reference characters.

Means is provided for bracing the axles 21 and 23 and comprises in each instance a clevis 15 pivotally connected to the axles 21 and 23 by pivot pins 26. The rear clevis 25 is pivoted to one end of a rod 27, the rear end of which is yieldably secured to the rear frame member 4 by suitable nuts 28 and spring 28a. The forward clevis 25 is pivoted to one end of a rod 29 and the forward end of the rod 29 is secured by suitable nuts 30 to an anchor member 31 that is supported on the frame 1 by arms 32, a spring 30a being interposed between the member 31 and the nuts 30 to provide a yieldable connection. The clevises 25 are pivoted to their respective axles 21 and 23 in vertical alignment with the pivot posts K so as not to interfere with steering movements of the axles.

Means is provided at the forward end of the trailer frame for coupling the latter to a towing vehicle (not shown). The coupling means comprises a disk-like operating member or fifth wheel 33 rotatably mounted on a pin 34 that is secured on the cross brace 6 and on the longitudinal axis of the frame 1. The fifth wheel 33 may be adapted for connection to a mating fifth wheel (not shown) of the kind normally mounted at the rear of a towing tractor or the like, but for the sake of convenience the fifth wheel 33 is shown as being equipped with supporting means 35 supporting an axle 36 on which wheels 37 are journaled, the axle 36 also being connected to a draw bar 38 adapted to be coupled to a towing vehicle. Regardless of the kind of coupling mechanism used at the forward end of the trailer, the important consideration is that the member 33 be rotatable relatively to the trailer frame when the towing vehicle makes a turn and, in the disclosed embodiment, the coupling member 33 is rotatable through substantially 90° on either side of the longitudinal axis of the trailer frame from the position shown in FIGURES 1 and 2.

Force transmitting means is provided for transmitting the turning force of the coupling member 33 to the rear axle assemblies. The force transmitting means comprises a reciprocable force transmitting rod 39 mounted in bearings 40 fixed to the inner surface of the side frame member 3. To the rod 39 is welded or otherwise suitably fixed a coupling 41 to which one end of a link 42 is pivotally connected. The other end of the link 42 is pivotally connected to a crank arm 43 that is rigidly connected to a post 44 mounted on the brace 6a for rotation. The post 44 extends through the brace 6a and is fixed to a tubular sleeve 45 which slidably receives an actuating rod 46 having its forward end eccentrically pivoted on the coupling member 33 by a pin 47.

The arrangement of the parts of the force transmitting means thus far described is such that rotation of the member 33 in either a clockwise or counter-clockwise direction, as viewed in Figure 1, will cause the rod 46 to effect an opposite rotation of the sleeve 45. The rotation of the sleeve 45 will cause a corresponding rotation of the crank arm 43, which rotation will be transmitted by the link 42 and the coupling 41 to the rod 39 so as to cause either fore or aft movement of the latter relative to the frame. The sleeve 45 and the rod 46 constitute a lost motion device which functions in a manner and for a purpose presently to be explained.

Adjacent the rear end of the trailer frame, the rod 39 is provided with a coupling 48 similar in all respects to the coupling 41 and to which is pivoted one end of a link 49. The other end of the link 49 is pivoted to one arm 50 of a bell crank lever 51 that is journaled for rotation on the cross brace 8 by a pin 52. The pin 52 is fast with the arm 50 and with the second arm 53 of the bell crank lever so that the arms 50 and 53 rotate or rock in unison. To the free end of the crank arm 53 is pivoted one end of a link 54, the other end of which is pivoted to a slide 55 which is slidably mounted on a transverse bar 56 that is secured to the side frame members 2 and 3. The construction and arrangement of the parts of the force transmitting means just described are such that fore and aft movement of the rod 39 causes corresponding movement of the link 49, which in turn causes either clockwise or counterclockwise movement of the bell crank 51. Movements of the crank 51 cause sliding movements of the slide 55 laterally of the trailer frame.

The slide 55 comprises a sleeve 57 having a pair of wings 58 extending therefrom fore and aft of the trailer frame. To the rearwardly extending wing 58 is pivotally secured one portion 59 of a telescoping link 60, the other portion 61 slidably receiving the portion 59 and being rigidly secured to a semi-circular yoke member 62 having its ends pivotally connected to clasps 63 which are secured to the axle 21. The link 60 and its associated parts transmit to the rear axle assembly the turning force of the operating member 33. The forwardly projecting wing 58 is similarly pivoted to one portion 64 of a telescoping link 65, the other portion 66 of which is fixed to a similar semicircular yoke 67 having its ends pivoted to similar clasps 68 which are secured to the axle 23.

Whenever rocking of the bell crank 51 causes lateral movement of the sleeve 57 and truning movement of the rear axle 21, the links 60 and 65 effect turning movement of the forward axle 23. The motion transmitting links 60 and 65 constitute a toggle mechanism operating simultaneously to rotate the axles 21 and 23 in opposite directions.

Referring now to FIGURE 3, the construction of the steering means is such that counterclockwise turning of the operating member 33 causes clockwise turning of the sleeve 45 and, consequently, clockwise turning of the crank arm 43. Clockwise rotation of the crank arm 43 causes rearward movement of the force transmitting bar 39, and rearward movement of the bar 39 causes clockwise rotation of the bell crank 51 and clockwise rotation of the axle 21. It should be noted that the direction of rotation imparted to the axle 21 is opposite to the direction of rotation of the member 33. This provides for better tracking of the rear wheels 22.

The rotation imparted to the axle 21 is transmitted to the axle 23 by means of the sleeve 57, the link 65, and their associated parts, but the direction of rotation of the axle 23 is opposite to the direction of rotation of the axle 21, thereby minimizing the possibility of scraping the tires 24 across the pavement during turning movements of the trailer. Rotation of the member 33 in a clockwise direction causes corresponding opposite rotation of the axles 21 and 23.

There are many instances when it may be desirable to rotate the actuating member considerably more than is required merely to steer the rear axle assemblies 21 and 23. For example, if the trailer should be backed against a loading dock in such manner as to require the trailer and its towing vehicle to extend partly across a street or highway, it is conventional practice to jackknife the trailer and towing vehicles so that the tractor extends substantially at right angles to the trailer in order to occupy as little highway space as is possible. In such instances it is desirable to avoid corresponding rotation of the axle assemblies 21 and 23 so as not unduly to decrease the lateral stability of the trailer.

In apparatus constructed in accordance with the invention, steering movements of the axle assemblies 21 and 23 are effected by rotation of the member 33 only about 20° in either direction from its position shown in FIGURE 1. Rotation of the member 33 counterclockwise about 20° from the position shown in FIGURE 1 will locate the parts 45 and 46 in the positions shown in FIGURE 3 and further rotation of the member 33 in a counterclockwise direction, as viewed in FIGURE 3, will result in lost motion between the rod 46 and the sleeve 45 with no further rotation of the axle assemblies taking place. Thus, the member 33 may be rotated from the postion shown in FIGURE 3 to the position shown in FIGURE 4 without any additional rotation of the axle assemblies. Even though the axle assemblies do not partake of further steering movements, they are restrained in the positions shown in FIGURE 4 by the interengagement of the sleeve 45 and the rod 46.

The invention includes means for equalizing the weight supported by each wheel of the rear axle assemblies and for stabilizing the trailer frame. Such means comprises a pair of rear bell crank levers 70 having rearwardly extending arms 71 and downwardly extending arms 72. Each bell crank lever 70 is pivoted as at 73 to a vertical member 74 that is secured to the associated frame member 2 or 3. The rearwardly extending arm 71 of each bell crank member is pivoted to a vertically extending link 75 which in turn is pivoted to the rear suspension members 15. The apparatus also includes a pair of forward bell crank members 76 having forwardly extending arms 77 and downwardly extending arms 78. The bell crank members 76 are pivoted as at 79 to vertical members 80 that are secured to the respective side frame members 2 and 3, and the forwardly extending arms 77 are pivoted to links 81 which in turn are pivoted to the forward suspension members 15. The downwardly extending arms 72 and 78 at each side of the frame member are interconnected by a rod 82, the ends of which are pivoted to the arms 72 and 78.

The construction and arrangement of the stabilizing means are such that vertical movement of either of the wheels 22 or 24 at one side of the frame will cause corresponding vertical movement of the other wheel 24 or 22, but in the opposite direction. Thus, should the wheel 22 at one side of the frame roll over a block or other obstructions, for example, it will move upwardly relatively to the frame so as to cause clockwise rotation of the bell crank 70, as viewed in FIGURE 2. Clockwise rotation of the bell crank 70 will cause corresponding rotation of the bell crank 76, due to the connecting rod 82, whereupon the arms 77 will exert a downward force on the forward suspension member 15 and on the wheel 24. As a consequence, the wheel 24 will be forced to bear its proportionate share of the load.

The disclosed embodiment is representative of a presently preferred form of the invention, but is intended to be illustrative rather than definitive thereof. The invention is defined in the claims.

I claim:

1. A trailer vehicle adapted to be connected to and towed by a towing vehicle, said trailer vehicle comprising a frame having a forward end and a rearward end; first axle means; first mounting means mounting said first axle means for swiveling movements about a substantially vertical axis; first suspension means yieldably mounting said first mounting means on and adjacent the rearward end of said frame for substantially vertical movements of said first axle means relative to said frame; second axle means; second mounting means mounting said second axle means for swiveling movements about a substantially vertical axis; second suspension means yieldably mounting said second mounting means on said frame forwardly of said first axle means for substantially vertical movements thereof relative to said frame; pivotal means linking the suspension means of said first and second axle means for transmitting vertical movement of either of said first and second axle means and reacting with said frame to the other but in an opposite direction, said linking means comprising a pair of bell cranks each pivoted on said frame adjacent its respective axle means and connected to one another; coupling means rotatably mounted at the forward end of said frame for coupling said frame to a towing vehicle; and force transmitting means interconnecting said coupling means and each of said axle means for transmitting rotation of said coupling means to each of said axle means.

2. A trailer vehicle adapted to be towed by a towing vehicle and comprising a frame having a forward end and a rearward end; first axle means; means mounting said first axle means at the rearward end of said frame for swiveling movements about a substantially vertical axis; second axle means; means mounting said second axle means on said frame forwardly of said first axle means and for swiveling movements about a substantially vertical axis; coupling means rotatably mounted at the forward end of said frame and substantially on the longitudinal axis of said frame for rotation about a substantially vertical axis through substantially 90° in opposite directions from the longitudinal axis of said frame; a link eccentrically pivoted on said coupling means; a crank member rotatably mounted on said frame rearwardly of said coupling means, one end of said crank member being slideably connected to said link, said crank member being rotatable by said link in response to rotation of said coupling means through an arc substantially less than 90° in either direction from said longitudinal axis, but further rotation of said coupling means in either direction a distance greater than said arc causing lost motion of said link relative to said crank member without further rotating said crank member; a force transmitting member slideably mounted on said frame and extending longitudinally thereof; means pivotally connecting said force transmitting member to the other end of said crank member for effecting sliding movements of said force transmitting member in response to rotation of said crank member; crank means pivoted on said frame member and connected to said force transmitting member and to one of said axle means for rotating the latter in response to sliding movements of said force transmitting member; and motion transmitting means interconnecting said first and second axle means for transmitting rotation of said one of said axle means to the other of said axle means, but in opposite directions.

3. The apparatus set forth in claim 2 wherein said motion transmitting means comprises a pair of links pivoted to the respective axle means and to one another.

4. A trailer vehicle adapted to be connected to and towed by a towing vehicle, said trailer vehicle comprising a frame having a forward end and a rearward end; first axle means rotatably mounted on said frame adjacent the rearward end thereof for steering movements; second axle means rotatably mounted on said frame forwardly of said first axle means for steering movements; mounting means for each of said axle means including yieldable suspension means interposed between said frame and each of said axle means at each side of the frame to permit limited vertical movement of each of said axle means relative to said frame; means interconnecting each of said suspension means and reacting with said frame at each side of the latter for effecting vertical movement in one direction of the suspension means of one of said axle means in response to vertical movement in the opposite direction of the suspension means of the other axle means; motion transmission means interconnecting said axle means for transmitting rotation of one of said axle means to the other of said axle means; rotatable coupling means mounted on and adjacent the forward end of said frame for coupling said frame to a towing vehicle; actuating means mounted on said coupling means for rotation therewith; rockable crank means mounted on said frame; force transmitting means interconnecting said crank means and said one axle means for transmitting to the latter rocking movement of said crank means; and slidable lost motion means interconnecting said actuating means and said crank means operable to rock the latter in response to a predetermined amount of rotation of said coupling means in either of two directions and thereafter to disable rocking of said crank means upon further rotation of said coupling means beyond said predetermined amount.

References Cited in the file of this patent

UNITED STATES PATENTS

| | | |
|---|---|---|
| 1,894,776 | Liang | Jan. 17, 1933 |
| 2,785,909 | Barnard | Mar. 19, 1957 |
| 2,794,655 | Charette | June 4, 1957 |
| 2,797,106 | Lorr | June 25, 1957 |
| 2,925,285 | Haas | Feb. 16, 1960 |

FOREIGN PATENTS

| | | |
|---|---|---|
| 74,521 | Denmark | Aug. 4, 1952 |
| 215,469 | Great Britain | May 15, 1924 |